C. UPTON.
ANTIFRICTION BEARING.
APPLICATION FILED MAR. 6, 1911.
1,022,163.
Patented Apr. 2, 1912.
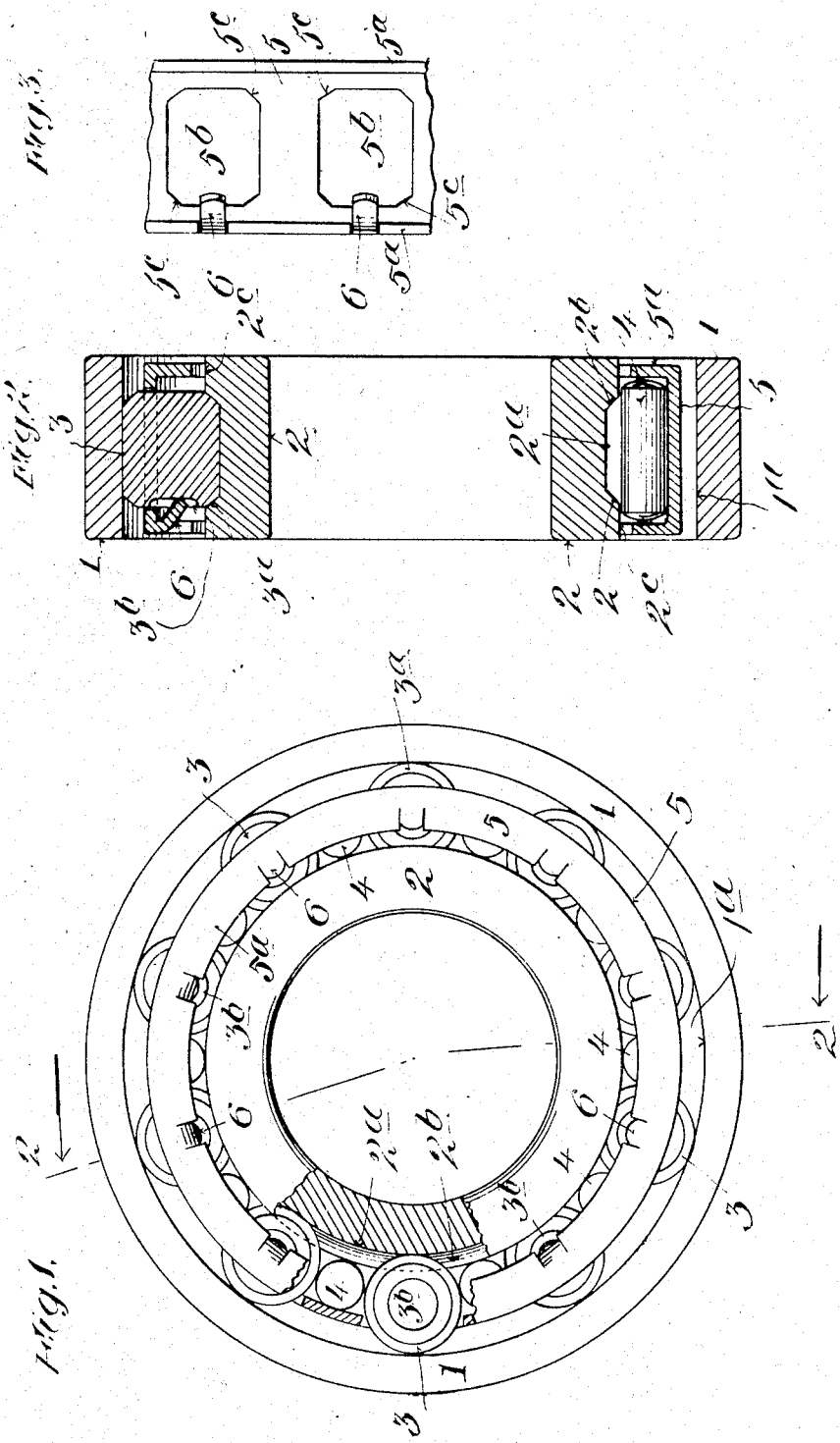

1,022,163. ANTIFRICTION-BEARING. COLCORD UPTON, Baltimore, Md., assignor to Simplex Roller Bearing Company, New York, N. Y., a Corporation of New York. Filed Mar. 6, 1911. Serial No. 612,465.

*To all whom it may concern:*

Be it known that I, COLCORD UPTON, a citizen of the United States, and resident of Baltimore city, State of Maryland, have invented certain new and useful Improvements in Antifriction-Bearings, of which the following is a specification.

The object of my invention is to provide an anti-friction bearing, simple in construction and efficient in use, wherein the rolling members will be retained in proper operating position between the inner and outer raceways, and will be retained in position upon one of the raceways when the other raceway is removed.

My invention comprises novel details of improvement and combinations of parts that will be more fully hereinafter set forth and then pointed out in the claims.

Reference is to be had to the accompanying drawings forming part hereof, wherein, Figure 1 is a partly broken side view of an anti-friction bearing embodying my invention; Fig. 2 is a section on the line 2, 2, in Fig. 1, and Fig. 3 is a detail looking at the inner surface of the retainer or cage for the rolling members.

The numeral 1 indicates an outer ring-like member or race and 2 indicates an inner race concentric with the outer race or member. The race ring 2 is shown provided with a peripheral raceway or groove $2^a$ receiving rolling members, such as rollers 3, that also bear against the raceway or wearing surface $1^a$ of race 1. The corners $2^b$, of raceway $2^a$ are shown beveled to coact with the corresponding beveled edges $3^a$ of rollers 3. Between the rollers 3 are separator rolls 4.

At 5 is a retainer, separator or cage, shown in grooved ring-like form fitted freely between the races 1, 2. The retainer or cage 5 has flanges $5^a$ on opposite sides between which the rollers 3 and rolls 4 are fitted, the separator rolls 4 being of such length as to coact with the flanges $5^a$ whereby endwise movement of the separator rolls is limited. Retainer 5 is also provided with spaced openings $5^b$ through which the working rollers 3 project into coaction with the raceways. The corners $5^c$ of openings $5^b$ are shown beveled to coact with the beveled edges of rollers 3.

To retain the working rollers 3 upon race 2 when the outer race 1 is removed, the retainer or cage 5 is provided with projections 6 adapted to enter recesses $3^b$ in the corresponding ends of rollers 3. I have shown the projections 6 stamped or cut from the material of retainer or cage 5, in the arrangement shown the projections 6 being formed by cutting, at spaced distances, the corresponding flange $5^a$ and bending said projections inwardly into the recesses $3^b$ of rollers 3.

To assemble the parts the retainer or cage 5 is placed around the inner race 2, the separator rolls 4 are inserted in the groove of retainer 5, as by passing said rolls through the openings $5^b$ of the retainer, the working rollers 3 are then passed through the openings $5^b$ of the retainer into the raceway $2^a$, and the projections 6 are bent into the corresponding rollers 3, whereby said parts are retained upon race 2; the outer member or race 1 may then be slid over rollers 3, and the parts assume the positions shown in Fig. 2. The separator rolls 4, by bearing upon the annular surface $2^c$ at the sides of raceway $2^a$, sustain the retainer or cage 5 so that the same may float freely around between races or members 1, 2, and as rollers 3 are retained in the raceway $2^a$ and project through the openings $5^b$ of the retainer the latter is kept from lateral displacement relatively to race 2. The members or races 1, 2, may be mounted upon and attached to shafts, hubs and the like in any well known manner.

While I have illustrated and described a practical embodiment of my invention, it will be understood that changes may be made in the construction and arrangements set forth, within the scope of the appended claims, without departing from the spirit of the invention.

Having now described my invention what I claim is:—

1. An anti-friction bearing comprising inner and outer race rings, rolling members between said race rings, a retainer between said race rings provided with spaced flanges forming a continuous groove, and separator rolls between said flanges and between said rolling members, said retainer being separate from said race rings and free to rotate therebetween, the separator rolls at their ends abutting the adjacent inner faces of said flanges and being free from said retainer to assume required positions between the rolling members, the annular portion of the retainer between the flanges retaining the separator rolls from outward radial displacement.

2. An anti-friction bearing comprising inner and outer race rings, rolling members between said race rings, an inwardly annularly grooved retainer between said race rings provided with spaced radial flanges and openings receiving said rolling members, and separator rolls within the groove of the retainer, said retainer being separate from said race rings and free to rotate therebetween with the travel of the rolling members, the separator rolls at their ends abutting the adjacent inner faces of said flanges, and being free from said retainer to assume required positions between the rolling members, the annular portion of the retainer between the flanges retaining the separator rolls from outward radial displacement.

3. An anti-friction bearing comprising inner and outer race rings, rolling members between said race rings, a retainer provided with openings receiving the rolling members and having spaced radial flanges adjacent the ends of the rolling members forming a continuous groove, and separator rolls between the flanges and between the rolling members and located within said groove, said retainer being separate from said race rings and free to rotate therebetween with the travel of the rolling members, the separator rolls at their ends abutting the adjacent inner faces of said flanges, and being free from said retainer to assume required positions between the rolling members, the annular portion of the retainer between the flanges retaining the separator rolls from outward radial displacement.

4. An anti-friction bearing comprising inner and outer race rings, rolling members therebetween, and a retainer between said race rings provided with spaced flanges, openings receiving said rolling members, said rolling members having recesses, the retainer having projections entering said recesses, said retainer having an inner continuous groove, and separator rolls within said groove and between said rolling members, the ends of the separator rolls abutting the flanges of the retainer.

5. An anti-friction bearing comprising inner and outer concentric race rings, rolling members therebetween, a retainer between said race rings provided with openings receiving said rolling members, and having parallel flanges, said rolling members having recesses and the retainer having projections entering said recesses, and separator rolls between said rolling members and flanges, the ends of the separator rolls abutting the flanges of the retainer.

6. An anti-friction bearing comprising inner and outer race rings, rolling members therebetween, a grooved retainer between said race rings provided with openings and having projections extending inwardly, said rolling members having end recesses receiving said projections, and separator rolls between said rolling members and within the groove of the retainer, the latter surrounding the separator rolls, the retainer having an annular portion against which the separator rolls may bear to limit radial displacement of said rolls.

7. An anti-friction bearing comprising inner and outer race rings, one of said race rings having a peripheral raceway, rolling members between said race rings and within said raceway, a grooved retainer between said race rings having openings receiving said rolling members and having radial spaced flanges, said retainer having projections, said rolling members having recesses receiving said projections, and separator rolls between said rolling members and within the groove of the retainer, the separator rolls at their ends abutting the adjacent inner faces of said flanges and being free from said retainer to assume required positions between the rolling members, the annular portion of the retainer between the flanges retaining the separator rolls from outward radial displacement.

8. An anti-friction bearing comprising inner and outer race rings, rolling members between said race rings, a retainer between said race rings provided with spaced flanges, and separator rolls between said flanges and between said rolling members, said retainer having projections and said rolling members having recesses receiving said projections, said flanges limiting endwise movement of said separator rolls, said retainer having an annular portion surrounding said rolls and limiting radial displacement of the latter.

9. An anti-friction bearing comprising inner and outer race rings, rolling members between said race rings, a retainer between said race rings provided with spaced flanges, and separator rolls between said flanges and between said rolling members, said retainer having projections cut from one of said flanges, and said rolling members having recesses receiving said projections, said flanges abutting the ends of the separator rolls and limiting endwise movement thereof, said retainer having an annular portion surrounding said rolls and limiting radial displacement of the latter.

10. An anti-friction bearing comprising inner and outer race rings, one of said race rings having an annular raceway, rolling members between said race rings and fitting said raceway, a retainer between said race rings provided with openings receiving said rolling members and having opposed spaced flanges, and separator rolls between said flanges, said retainer being provided with projections, said rolling members having end recesses receiving said projections, said flanges abutting the ends of the separator rolls and limiting endwise movement thereof, said retainer having an annular portion surrounding said rolls and limiting radial displacement of the latter.

Signed at New York city, in the county of New York, and State of New York, this 3rd day of March, A. D. 1911.

COLCORD UPTON.

Witnesses:
MARIE F. WAINRIGHT,
T. F. BOURNE.